United States Patent
Dutt et al.

[11] Patent Number: 5,263,606
[45] Date of Patent: Nov. 23, 1993

[54] SQUEEZE CONTAINER WITH SONICALLY WELDED FLEXIBLE TUBULAR BODY AND BOTTOM COVER

[75] Inventors: Herbert V. Dutt, Venetia, Pa.; Gary L. Mengeu, Wheeling, W. Va.

[73] Assignee: Continental Plastics, Inc., Triadelphia, W. Va.

[21] Appl. No.: 822,121

[22] Filed: Jan. 17, 1992

[51] Int. Cl.$^5$ .............................................. B65D 7/42
[52] U.S. Cl. ..................... 220/613; 220/617; 156/272.2; 53/DIG. 2; 403/270
[58] Field of Search ................. 222/207-215, 222/145; 220/612, 613, 617, 618, 621, 636; 156/272.2, 274.4; 403/270; 53/471, 478, 485, DIG. 2

[56] References Cited

U.S. PATENT DOCUMENTS

| | | | |
|---|---|---|---|
| 2,626,647 | 1/1953 | Barton | 220/612 X |
| 2,741,402 | 4/1956 | Sayre | 220/612 |
| 2,857,076 | 10/1958 | Tolbert, Jr. et al. | 220/612 |
| 3,706,393 | 12/1972 | Curtis et al. | 220/613 |
| 4,886,181 | 12/1989 | Haines | 220/613 X |
| 5,040,357 | 8/1991 | Ingemann | 53/478 |
| 5,141,133 | 8/1992 | Ninomiya | 222/541 X |

Primary Examiner—Andres Kashnikow
Assistant Examiner—Kenneth DeRosa
Attorney, Agent, or Firm—R. V. Westerhoff; George K. Stacey

[57] ABSTRACT

A squeeze container has a flexible tubular body and a separately molded bottom cover. The bottom cover has an axially facing continuous groove in which the open end of the tubular body seats with the end surface of the tube abutting the bottom surface of the groove. A radially outwardly extending flange spaced axially from the open end of the container has a bottom surface which abuts a top surface on a lip extending radially outward from the groove in the bottom cover. A tubular extension on the bottom cover radially inward of the groove has an outer surface which abuts the inner surface of the tubular body. Sonic energy directors in the form of continuous pointed ribs effect sonic welds between each of the sets of abutting surfaces to hermetically seal the bottom cover to the tubular body.

13 Claims, 3 Drawing Sheets

SQUEEZE CONTAINER WITH SONICALLY WELDED FLEXIBLE TUBULAR BODY AND BOTTOM COVER

BACKGROUND OF THE INVENTION

1. Field of the Invention

This invention relates to a flexible thermoplastic container in which the side walls are squeezed to dispense contents of the container. More particularly, it relates to such squeeze containers in which a flexible tubular body and bottom cover are separately molded and then joined together. The invention is particularly concerned with the hermetically sealing the bottom cover to the tubular body.

2. Background Information

Thermoplastic squeeze containers are typically injection blow molded with the bottom wall integral with the side wall, and are filled through a neck which is often then provided with a dispensing fitment. In some applications, it is not possible to blow mold the container with an integral bottom or it is desirable to have a large bottom opening through which the tubular body can be rapidly filled or through which a mixing ball can be inserted. For instance, it is not possible to injection blow mold a squeeze container with multiple compartments. The tubular body with the appropriate divider(s) and the bottom cover are separately injection molded and then must be assembled.

A major problem in joining a separately molded bottom cover to the flexible tubular wall of a squeeze container is obtaining and maintaining a hermetic seal. The repeated flexure of the tubular body to dispense the contents of the container applies continual stresses which can fatigue the joint between the flexible side wall and the bottom cover.

It is known to sonically weld components of thermoplastic containers. Sonic energy directors in the form of sharp edged projections are used to concentrate the sonic energy to achieve the energy density needed to melt the thermoplastic at the joining surfaces. Without the sonic energy directors, the energy is distributed over too large a surface to achieve the heat needed to fuse the parts. Usually, sonic welding is used for joints in thermoplastic containers which are not subjected to high stress concentrations or, they are used for tacking parts together which are intended to be broken loose during use such as tamper evident closures.

There remains a need for a thermoplastic squeeze container having a separately molded bottom cover which is firmly secured to the flexible tubular body to form a hermetic seal which is maintained throughout the useful life of the container.

SUMMARY OF THE INVENTION

This need and others are satisfied by the invention which is directed to a thermoplastic squeeze container having a flexible tubular body and a separately molded bottom cover. The open bottom end of the tubular body seats in an axially facing groove in the bottom cover with the end surface of the tubular body seating against the bottom surface of the groove. The bottom surface on a radial flange spaced from the open bottom end of the tubular body abut an axially facing top surface on the bottom cover adjacent the groove. The opposite wall surface of the tubular body from the surface from which the flange projects abuts a side wall of the groove in the bottom cover. At least one surface in at least one, and preferably all three, of these abutting pairs of surfaces is provided with sonic energy directors which concentrate applied sonic energy to fuse the abutting surfaces together.

As another aspect of the invention, the bottom cover can have a tubular extension which extends the side wall surface of the groove which abuts the side wall of the tubular member above the top of the groove. The sonic energy director for the associated pair of abutting surfaces may be above or below as well as even with the top surface adjacent the groove.

Preferably, the flange on the tubular body projects radially outward and the abutting top surface on the bottom cover can be formed on a radially outwardly projecting lip on the bottom cover. Also preferably, the energy directors are formed on the abutting surfaces of the bottom cover. Regardless of the surface they are formed on, the sonic energy directors are preferably continuous pointed ribs. Preferably, two such ribs are provided in the bottom of the groove in the cover and on the top surface of the lip which joins with the flange on the tubular body. These pairs of sonic energy director ribs are concentric with the outer rib on the top surface of the end cover being smaller than the inner rib.

The invention provides a strong connection between the flexible tubular body and separately molded bottom cover, preferably with both horizontal and vertical sonic welds, and effects a permanent hermetic seal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
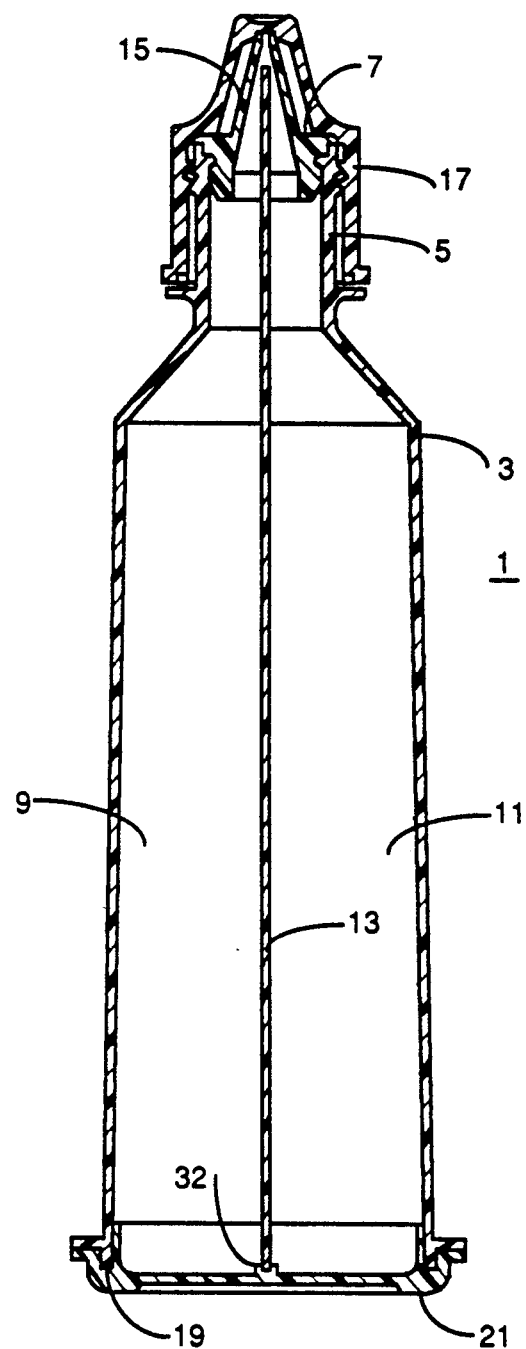
FIG. 1 is a vertical sectional view through a squeeze container in accordance with the invention.
Figure 2:
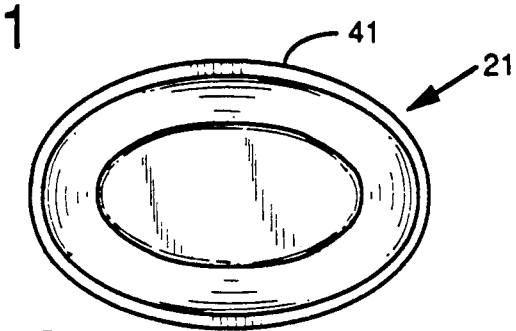
FIG. 2 is a bottom plane view of the container of FIG. 1.

Referring to FIGS. 1 and 2, the container 1 includes an injection molded tubular body which tapers inward at its upper end and terminates in an externally threaded neck 5 which forms an opening 7. The tubular body is oval in cross section, as can be seen from FIG. 2. The interior of the tubular body is divided into two compartments 9 and 11 by a divider wall 13 which extends generally across the minor axis of the oval cross section. The divider wall 13 extends all the way up into the neck 5 and into a dispensing fitment 15 which snaps into the opening 7. An internally threaded closure 17 engages the externally threaded neck 5 for sealing the container before and between uses.

Because the container body 3 has the internal divider wall 13, it cannot be blow molded. Instead, it must be injection molded with an open bottom end 19. A bottom cover 21 is separately injection molded and then secured to the bottom end of the tubular body 3. While the invention is shown applied to a container having an internal divider wall 13, it is applicable as well to containers without such divider walls in which the bottom cover is molded separately from the tubular body.

The two compartments 9 and 11 within the tubular body 3 are filled with two fluids to be dispensed simultaneously, and then the bottom cover 21 is secured to the bottom end 19 of the tubular body. The tubular body 3 is injection molded of a flexible thermoplastic material, for instance low density polyethylene. The invention is not limited to low density polyethylene material as other flexible thermoplastic resins may be used; however, low density polyethylene is particularly suitable for the squeeze container of the invention. Preferably, the bottom cover 21 is injection molded using the same resin from which the tubular body is molded.

Figure 3:
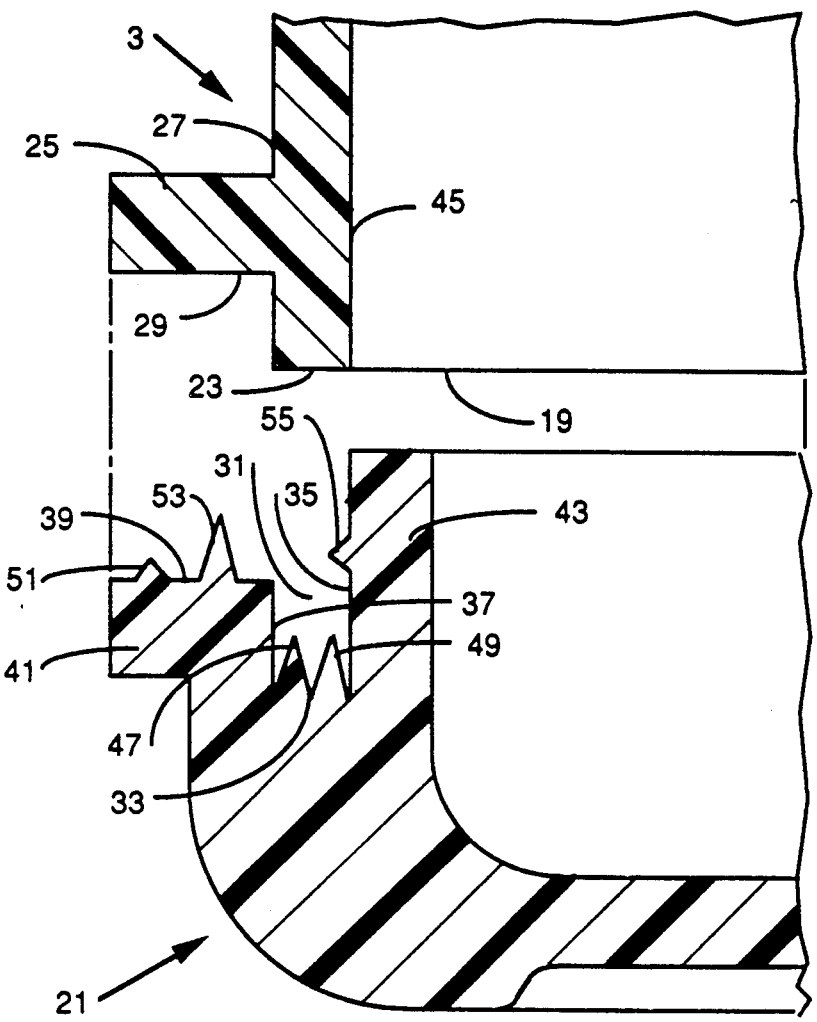
FIG. 3 is an exploded fragmentary section through a bottom corner of the squeeze container of FIG. 1, shown in enlarged scale.

In use, the closure 17 is removed from the container 1 and the tubular body 3 is squeezed to dispense the fluids in compartments 9 and 11 simultaneously. This repeated flexure of the tubular body applies severe stress to the juncture of the bottom of the tubular body with the bottom cover 21. This invention provides a unique arrangement for securing the bottom cover to the bottom end of the tubular body which effects a hermetic seal and which does not fatigue with the repeated flexure of the tubular body. This unique arrangement is best understood by reference to FIG. 3 which illustrates the bottom cover 21 in position for assembly to the bottom end of the tubular body 3. The open bottom end 19 of the tubular body 3 has an axially facing end surface 23. Spaced from the open bottom end 19 is a flange 25 extending radially outward from the outer surface 27 of the tubular body 3. The flange 25 which extends around the entire periphery of the tubular body 3 has an axially facing bottom surface 29.

The separately injection molded bottom cover 21 has a continuous axially facing groove 31 which is dimensioned for a line to line fit with the open bottom end 19 of the tubular body 3. This groove 31 has an axially facing bottom surface 33, an inner side surface 35 and an outer side surface 37.

Adjacent the groove 31 in the bottom cover 21 is an axially facing surface 39 formed in part by a radially outwardly projecting lip 41 which extends around the periphery of the bottom cover 21. The depth of the groove 31 corresponds to the spacing of the flange 25 from the bottom end 19 of the tubular body 3 so that with the bottom end 19 seated in the groove 31, the bottom surface 29 of the flange 25 seats against the top surface 39 on the lip 41.

In the preferred form of the invention shown, the bottom cover 21 also has a tubular extension 43 extending axially upward adjacent the inner surface 35 of the groove 31, thereby extending the surface 35 axially upward.

In assembling the container 1, the bottom end 19 of the tubular body 3 seats in the groove 31 to form a tongue and groove connection between the tubular body 3 and the bottom cover 21. As mentioned, the flange 25 seats against the lip 41 with the bottom end of the tubular member fully seated in the groove 31. This abutment of the flange 25 against the lip 41 stabilizes the tongue and groove connection by resisting moments caused by repeated flexure of the tubular body in dispensing the contents of the container. The tubular extension 43 provides a lead in for the bottom end of the tubular body 19 into the groove 31, and further stabilizes the tongue and groove connection by also resisting moments applied to the connection by flexure of the tubular body. The bottom of the divider 13, if used, seats in a groove 32 extending across the inner surface of the bottom cover 19 (see FIG. 1).

Figure 4:
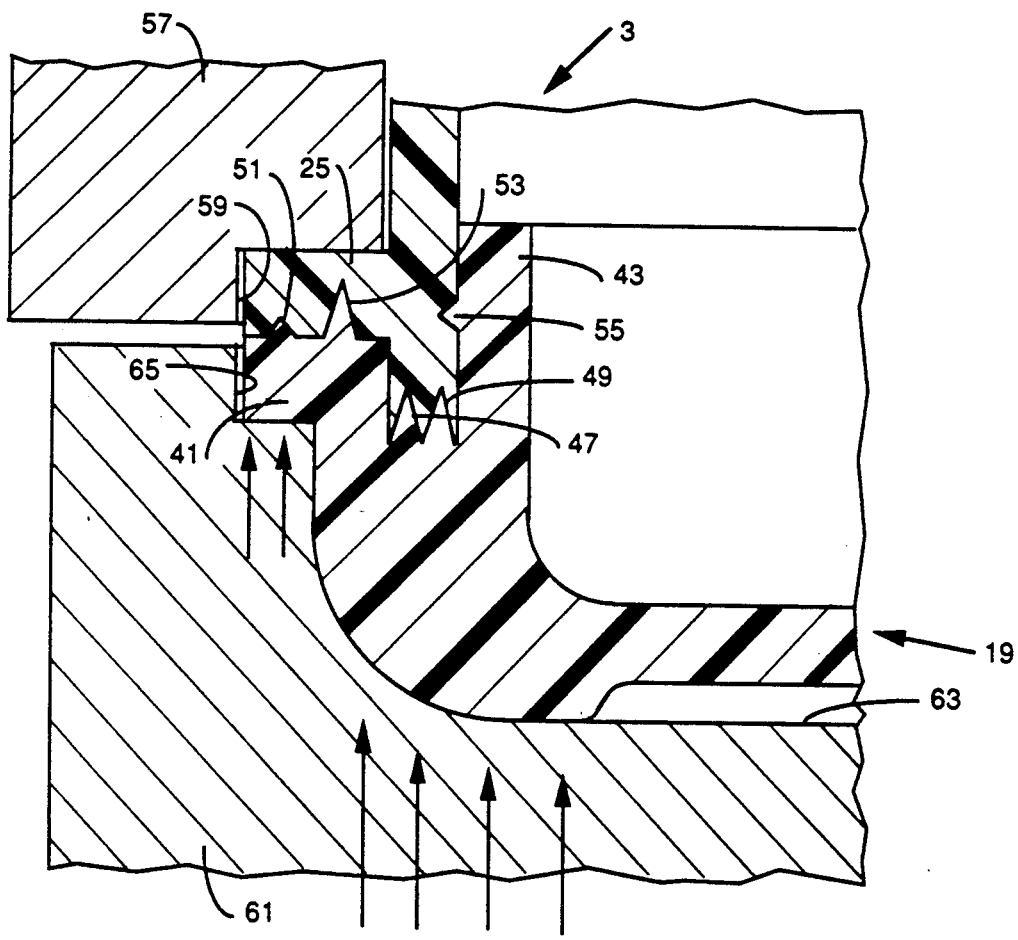
FIG. 4 is a fragmentary view of the same bottom corner of the container as depicted in FIG. 3 showing the parts assembled and mounted in apparatus for sonically welding the bottom cover to the tubular body.

FIG. 4 illustrates the assembly of the bottom cover and the bottom of the tubular body. As can be seen from FIGS. 3 and 4, the end surface 23 on the bottom end 19 of the tubular body 3 abuts the bottom surface 33 of the groove 31 to form a first pair of abutting surfaces. The side wall surface 35 of the groove 31 and its extension along the tubular extension 43 abuts the inner side wall surface 45 of the tubular body to form a second pair of abutting surfaces. In addition, the top surface 39 on the lip 41 of the bottom cover 21 and the bottom surface 29 on the flange 25 of the tubular body 3 form a third pair of abutting surfaces. These three pairs of abutting surfaces are fused together to secure the bottom cover to the bottom end of the tubular body 3. This bonding of these abutting surfaces is effected in accordance with the invention by sonic welding. It is well known that two flat thermoplastic surfaces cannot be bonded together by sonic welding. Energy directors are needed to concentrate the sonic energy to effect the heating required to fuse the confronting thermoplastic surfaces. Accordingly, sonic energy directors in the form of two continuous pointed ribs 47 and 49 are provided on the bottom surface 33 of the groove 31. Additional sonic energy directors in the form of the continuous pointed ribs 51 and 53 are provided on the surface 39, and in the form of the continuous pointed rib 55 on the surface 35.

Each of the sonic energy directors 47–55 in the exemplary embodiment of the invention shown is triangular in cross section with a base dimension of about 0.015 inches (0.38 mm). The ribs 47, 49 and 53 are approximately 0.023 inches (0.58 mm) high. The rib 51 is approximately 0.013 inches (0.33 mm) high while the rib 55 projects radially outward about 0.010 inches (0.25 mm). Thus, the rib 55 introduces about 0.010 inches (0.25 mm) of interference when the bottom end 19 of the tubular body 3 is inserted in the groove 31. This interference is readily accommodated by the flexibility of the materials.

FIG. 4 shows the arrangement for sonically welding the cover 21 to the bottom end of the tubular body 3. The tubular body is supported in a support nest 57 which has a counterbore 59 to accommodate the flange 25. The bottom cover 21 is seated on the bottom end 19 and a sonic weld horn 61 having a cavity 63 including a counterbore 65 to accommodate the lip 41 is placed over the bottom cover. Sonic energy is applied through the weld horn 61 to the bottom cover 19 as indicated by the arrows in FIG. 4. This sonic energy is concentrated by the sonic energy concentrators 47 through 55 to melt the thermoplastic and effect a solid bond between the three pairs of abutting surfaces. The melted thermoplastic tends to flow along the surfaces. As not as much flow is required near the perimeter of the abutting surfaces on the lip 41 and flange 25, the outer rib 51 is made smaller than the inner rib 53.

As can be appreciated, the invention provides at least one, and preferably multiple serial, continuous sonically welded bonds which hermetically seal the bottom cover 21 to the tubular body 3, and provides a strong connection with both vertical and horizontal welds which resists rupture of this hermetic seal.

While the sonic energy directors 47 through 55 are all shown on the abutting surface of the bottom cover 21 for each of the three pairs of abutting surfaces, it will be apparent that alternatively, the sonic energy directors could be molded on the confronting surface on the tubular body 3, or one of the energy directors could be provided on each abutting surface of a pair of the abutting surfaces. In addition, the sonic energy director 55 between the abutting surfaces 35 and 45 could be located anywhere along the surface 35, as well as being on either of the surfaces. However, it is preferred that the sonic energy director 55 be located above the groove 31.

While in the exemplary container shown, the flange 25 adjacent the bottom end of the tubular body 3 and the lip 41 on the bottom cover 21 extend radially outward, and the tubular extension 43 is radially inward of the groove 31, these orientations could be reversed, that is, the flange 35 and lip 41 could extend radially inward from the groove, and the tubular extension 43 could be located radially outside the groove 31.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A squeeze container comprising:
 a flexible thermoplastic tubular body with an open bottom end having a bottom edge surface, said tubular body having a flange with an axially facing bottom surface extending radially outward from an outermost side wall surface of the tubular body and axially spaced from said bottom end, a thermoplastic bottom cover enclosing the open bottom end of said tubular member and having an axially facing groove in which said bottom end of said tubular body seats with said groove having a bottom surface abutting the bottom edge surface of the tubular body to form a first pair of abutting surfaces and a side wall surface abutting an inner side wall surface of said tubular body to form a second pair of abutting surfaces, said cover having an axially facing top surface adjacent to and radially outward from said groove which abuts said bottom surface of said flange on the tubular body to form a third pair of abutting surfaces, and sonic energy director means on at least one abutting surface of at least one of said pairs of abutting surfaces which concentrates applied sonic energy to fuse said at least one pair of abutting surfaces together thereby hermetically sealing said bottom cover to said tubular body.

2. The squeeze container of claim 1 wherein said axially facing top surface on said bottom cover is formed on a lip extending radially outward from said bottom cover.

3. The squeeze container of claim 2 wherein said sonic energy director means comprises sonic energy directors on at least one surface of all three of said pairs of abutting surfaces.

4. The squeeze container of claim 1 wherein said sonic energy director means comprises sonic energy directors on at least one abutting surface of all three pairs of abutting surfaces.

5. The squeeze container of claim 4 wherein said sonic energy directors comprise continuous pointed ribs.

6. The squeeze container of claim 5 wherein said sonic energy directors are molded onto said abutting surfaces of said bottom cover.

7. The squeeze container of claim 5 wherein said sonic energy directors for said first pair of abutting surfaces comprise two concentric continuous pointed ribs.

8. The squeeze container of claim 5 wherein said sonic energy directors for said third pair of abutting surfaces comprise inner and outer concentric continuous pointed ribs.

9. The squeeze container of claim 8 wherein the outer concentric pointed rib is smaller than said inner continuous pointed rib.

10. The squeeze container of claim 1 wherein said bottom cover includes a tubular axial extension adjacent said groove and forming an extension of said side wall surface of said groove which abuts said inner side wall surface of said tubular body.

11. The squeeze container of claim 10 wherein said sonic energy director means for said second pair of abutting surfaces is molded on said extension of said side wall surface above said groove.

12. The squeeze container of claim 11 wherein sonic energy directors are molded on at least one abutting surface at each pair of abutting surfaces.

13. The squeeze container of claim 12, wherein said tubular axial extension is radially inward of said groove and forms an extension of an inner side wall of said groove which abuts said inner side wall of said tubular body.

* * * * *